No. 881,115. PATENTED MAR. 10, 1908.
N. FALLEK.
ELECTRICALLY OPERATED FENDER FOR STREET RAILWAY CARS.
APPLICATION FILED JUNE 17, 1907.
2 SHEETS—SHEET 1.
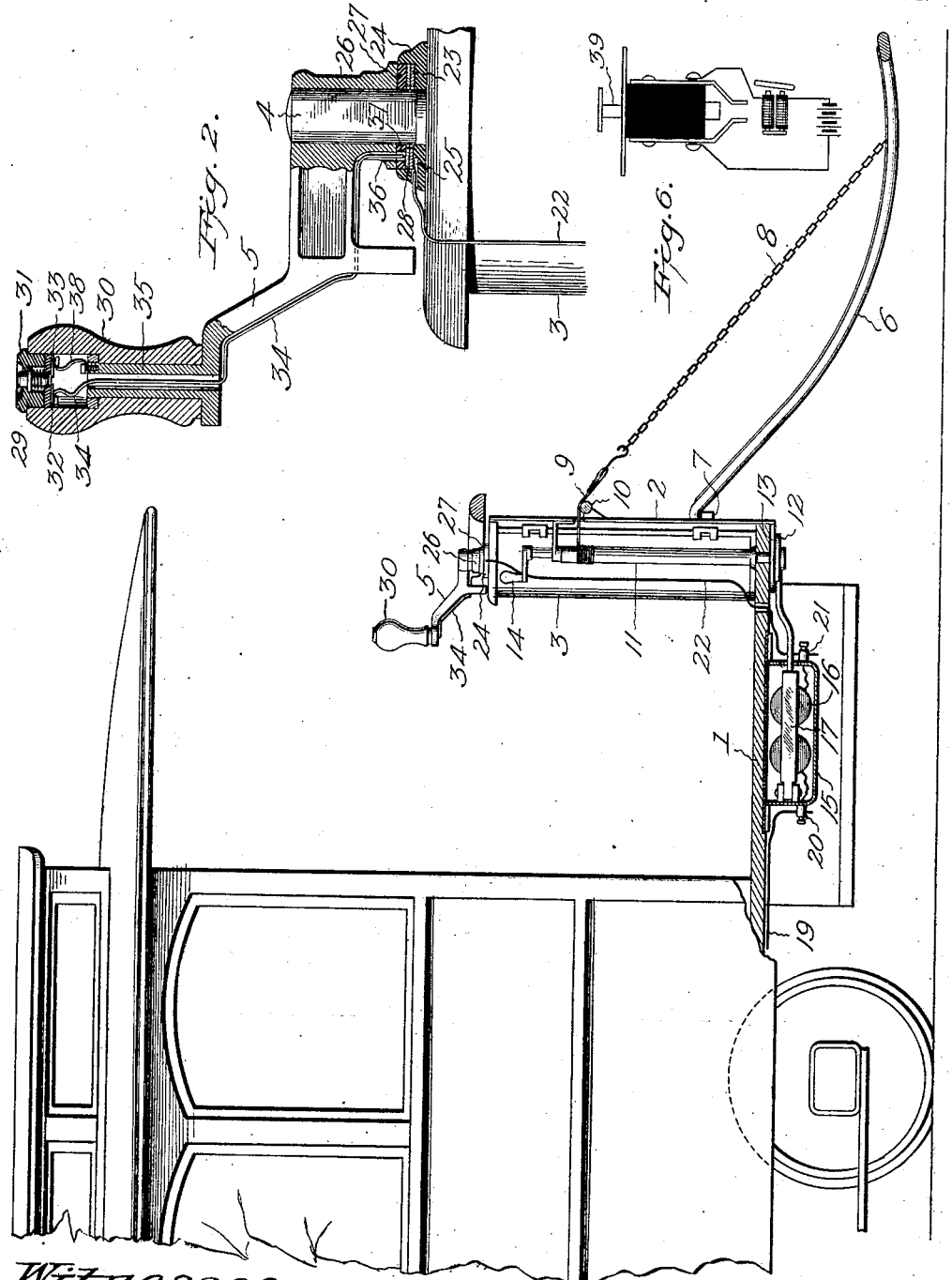

No. 881,115. PATENTED MAR. 10, 1908.
N. FALLEK.
ELECTRICALLY OPERATED FENDER FOR STREET RAILWAY CARS.
APPLICATION FILED JUNE 17, 1907.
2 SHEETS—SHEET 2.
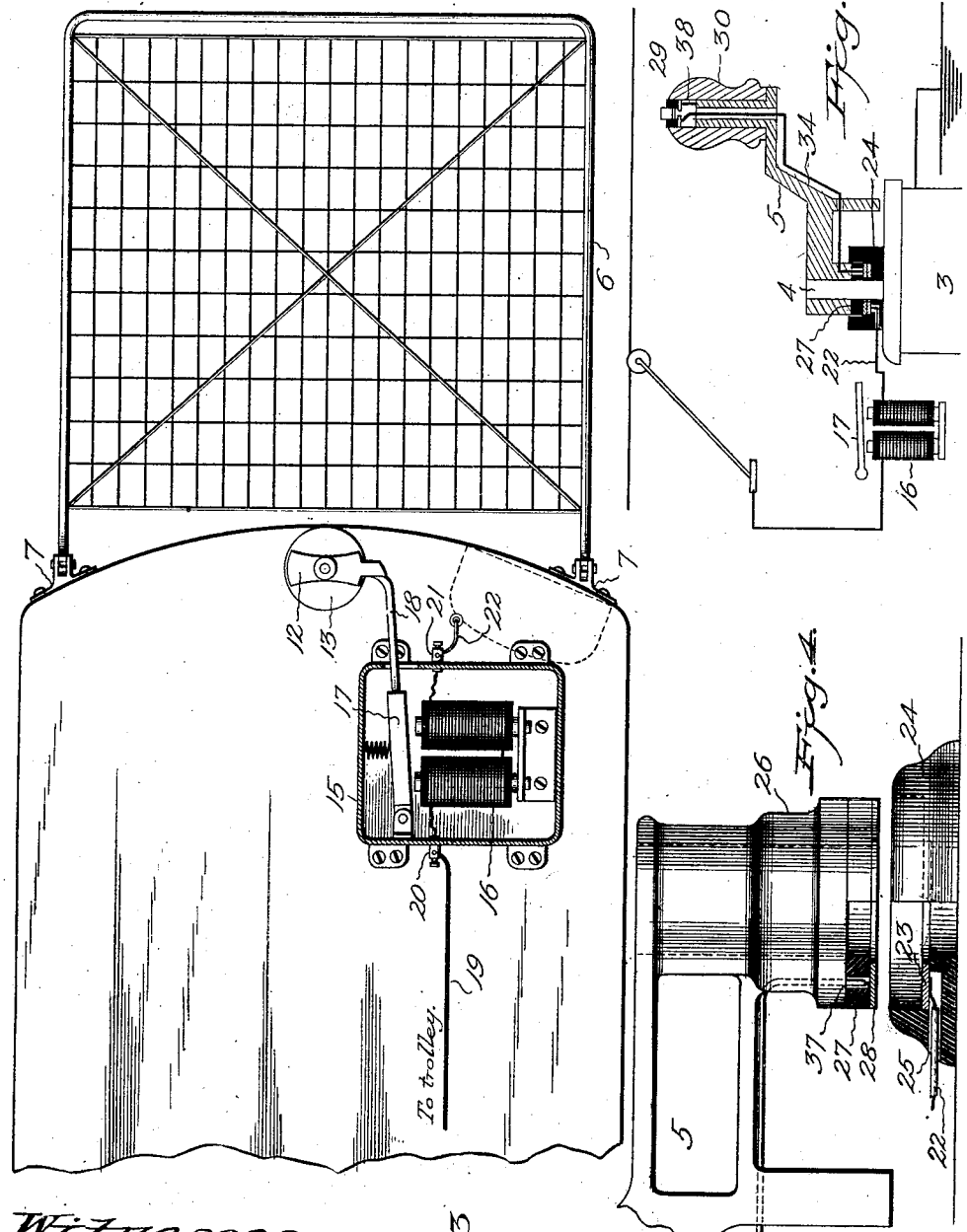
Witnesses:
G. Sargent Elliott.
Adella M. Towle.
Inventor:
By Nathan Fallek
H. S. Bailey. Attorney.

UNITED STATES PATENT OFFICE.

NATHAN FALLEK, OF DENVER, COLORADO.

ELECTRICALLY-OPERATED FENDER FOR STREET-RAILWAY CARS.

No. 881,115.　　　　　Specification of Letters Patent.　　　Patented March 10, 1908.

Application filed June 17, 1907. Serial No. 379,471.

*To all whom it may concern:*

Be it known that I, NATHAN FALLEK, a citizen of the United States of America, residing at the city and county of Denver and State of Colorado, have invented a new and useful Electrically - Operated Fender for Street-Railway Cars, of which the following is a specification.

My invention relates to electrically operated fenders, for street railway cars.

The objects of the invention are, first, to provide a fender which is held in an elevated position above the track, by a latch mechanism connected with an electric circuit, whereby the fender is dropped when the circuit is formed; second, to provide a fender which is raised to an inoperative position above the track, by the usual flexible means, which is wound around a revoluble shaft having an operating crank, the said shaft having a dog at its lower end adapted to be engaged by electrically operated mechanism under the control of the motorman, whereby said dog is released, and the fender dropped by the forming of an electric circuit; and third, to provide the usual winding shaft for the fender, with a dog adapted to be engaged by the armature of a magnet, in circuit with the trolley or with a battery, and with a make-and-break device connected with the controller crank, or with a foot lever, whereby the fender is dropped when a circuit is formed, said crank being adapted to be removed from the controller without disarranging the circuit wires. These objects are attained by the mechanism illustrated in the accompanying drawings, in which Figure 1, is a side elevation, partly in section, of a portion of a car, equipped with a fender, and with the improved means for holding and dropping the same. Fig. 2, is a view showing a portion of a controller and the crank mounted on the controller shaft, said crank being partly in section to show the circuit wires, by which a circuit may be formed with the trolley or with a battery, for operating the catch mechanism of the fender. Fig. 3, is a bottom plan view of the car illustrated in Fig. 1, showing the dog on the end of the fender winding shaft, engaged by the armature of a magnet, which is connected with a source of electric power and with the controller crank. Fig. 4, is a view partly in section, of a portion of the controller crank, provided with a contact ring on its hub end, and a non-conducting socket in which the hub of the crank rests, when in operative position, having a similar contact ring to that on the crank hub, which rings connect with circuit wires. Fig. 5, is a diagram illustrative of the manner in which a circuit is formed with the trolley, by a button in the handle of the controller crank, whereby a magnet in said circuit is energized and its armature moved to trip the fender operating mechanism; and Fig. 6, is a similar view, showing an electric circuit which is opened and closed by a foot lever.

Referring to the accompanying drawings, the numeral 1, designates the platform of a car, to the forward end of which a dash board 2, is secured in the usual manner. To one side of the platform and adjoining the dash board, is secured a controller 3, of the style in general use, having the usual shaft 4, upon which is mounted a crank 5. A fender 6, is hinged in brackets 7, secured to the dash board, and the hinge connection is of any preferred style, that will permit of the fender being removed, and transferred to the opposite end of the car, when desired. A chain or cable 8, is attached at its ends to the fender, adjacent to its forward end, and this chain or cable connects with a cable 9, which passes over a roller 10, secured to the dash board, and through an aperture in the said dash board, and is secured to a vertical, revoluble shaft or rod 11, which is supported at its upper end in a bracket secured to the dash board, while its lower end passes through the platform, and has secured thereto a dog 12, a bearing plate 13, being secured to the bottom of the car, through which the shaft passes, and against which the dog bears. A crank 14, is secured to the upper end of the shaft 11, and when the shaft is turned in the proper direction, by the said crank, the cable 9, will be wound around the shaft, and thereby lift the fender to the desired height above the track, at which time the dog 12, will be engaged by an electrically operated trip device, and the fender will be held in this position until released by the trip device, in a manner which will now be described.

To the under side of the car platform, is secured a housing 15, which incloses a suitable magnet 16, an armature 17 being pivoted adjacent thereto, in the usual manner, which is either long enough to project beyond the housing and engage the dog 12, or, as shown, is provided with an extension 18, performing the same office. One pole of the magnet is connected with the trolley or with a battery, by a wire 19, which is connected to a binding post 20, on the side of the housing, which post is connected to the winding of the adjacent magnet pole. A binding post 21, is secured to the opposite side of the housing and connects with the remaining pole of the magnet through its winding, and a wire 22, extends from this post to a metal contact plate or ring 23, which is secured in a non-conducting socket 24, mounted upon the top of the controller. This socket surrounds the controller shaft 4, and is provided with an axial hole through which the said shaft passes. The ring 23, is secured at the bottom of the socket, as shown in Figs. 2 and 4, and its axial hole or aperture is larger than the hole in the socket, so as to prevent its contact with the controller shaft. The wire 22, is insulated, and its free end passes through an aperture 25, in the socket, a sufficient portion of the insulation being removed from the extremity of the wire to permit it to be soldered or otherwise secured to the ring 23. The controller crank 5, has the usual hub 26, which fits upon the upper end of the controller rod, and this hub has secured to its lower end, a non-conducting ring 27, to which is secured a metal contact ring 28, the axial aperture of which is larger than the aperture in the non-conducting ring 27, in order to prevent the said contact ring from engaging the controller shaft.

A push button 29, of any preferred style, is secured within the upper end of the wooden portion 30 of the crank handle, the said button comprising the usual non-conducting housing 31, in which the button proper is housed, and the terminal contacts 32 and 33, which are engaged by a metal plate on the extremity of the shank of the button when it is pushed down. An insulated wire 34, is connected at one end with the contact 32, and passes down through a hollow metal stem 35, formed integral with the crank, and upon which the wooden handle 30 is secured. This wire then follows the outline of the crank as shown, and if desired it may lie in a groove in the crank, or pass through a hole formed in the inclined portion of the crank, so as to be protected against injury, and its lower end passes down through a hole 36, in the hub of the crank, and through a hole 37, in the non-conducting ring 27, to the contact ring 28, to which it is soldered or otherwise secured.

When the controller crank is in operative position upon the controller shaft, the lower end of its hub extends into the socket 24, and its contact ring 28, rests upon the contact ring 23 in the bottom of the socket, thus permitting a current of electricity to pass from the wire 22 to the wire 34, as will presently be fully shown, and when the crank is removed from the shaft, for any purpose—as, when the motorman leaves his car, there is no dis-arrangement of the wiring, and no screws to manipulate; the crank is simply lifted off from the controller shaft as are the cranks at present employed, and the trip mechanism is in no way affected thereby.

A wire 38, is secured at one end to the push button terminal 33, and at its other end to the metal portion of the handle, and with the arrangement of wires as described, when the button is pushed an electric circuit is formed, which energizes the magnet, trips the dog, and drops the fender.

In Fig. 6, I have shown a diagram in which the making and breaking of the electric circuit is accomplished by a foot lever 39, and this arrangement can be employed if desired, in place of the devices illustrated in the remaining views, but I prefer the former arrangement, as it is more directly within the reach of the motorman.

The operation of the improved device is as follows: The fender is hinged to the car in the manner described, and the controller crank is placed upon the end of the controller shaft and operated in the usual manner. The push button being in the upper end of the handle, is convenient to the thumb of the operator or motorman, and the top of the button is preferably below the top of its housing, so as to avoid the chance of its being accidentally depressed. The electric current by which the magnet is energized to operate the trip or armature, is normally open, and the projecting end of the armature engages the dog 12, to prevent the turning of the shaft 11, and the consequent dropping of the fender; but when it is desired to drop the fender, the motorman presses the button 29, which forms an electric circuit from the trolley through wire 19, to the magnet, and from the magnet through wire 22 to the contact ring 23, of the socket 24, thence by means of ring 28, on the crank hub, to wire 34 and terminal 32, and thence through terminal 33 and wire 38 to the metal portion of the crank handle, and the controller, to ground, through the wheels and other metal members of the car. The magnet is energized by the making of the circuit, and the armature 17 is thrown, thereby releasing the dog 12, which permits the cable 9 to unwind, and the fender to drop. The fenders at present in use, are raised, as above described, and held by a pawl and ratchet, at the lower end of the rod or shaft, answering to the shaft 11, and to operate this shaft and drop the fender requires an operation separate from that required to shut off the current or reverse the car, and moreover, the motorman must move away from the controller to accomplish it. In an emergency, when several operations must be accomplished separately, and in a few seconds, the motorman is apt to lose his presence of mind and fail to act quickly, but with my improved device, the operations of reversing the controller crank and dropping the fender are accomplished simultaneously, and the latter operation is accomplished in an instant, thereby greatly lessening the chance of accident.

Having described the invention, what I claim as new and desire to secure by Letters Patent is:

1. In a device of the character described, the combination with a car platform having a dash board, of a fender hinged thereto, a revoluble shaft on said platform, a flexible connection secured to said shaft and said fender, and means for turning said shaft to lift the fender, a dog on the end of said shaft, and an electrically operated latch for normally engaging said dog, and for releasing it to drop the fender.

2. In a device of the character described, the combination with a car platform having a dash board, of a fender hinged thereto, a crank operated shaft on said platform, a flexible connection uniting said shaft and fender, whereby to raise said fender when the shaft is turned, a dog on the end of the shaft, a magnet in circuit with a source of power, an armature in operative relation to said magnet, one end of which normally engages said dog, and means for closing the circuit, whereby the magnet is energized and the dog released.

3. In a device of the character described, the combination with a car platform having a dash board, of a fender hinged thereto, a revoluble shaft on the platform, a flexible connection uniting the shaft and fender, a roller for supporting the said flexible connection, and a crank for turning the shaft to lift the fender, a dog on the end of said shaft, a magnet in circuit with a source of electric power, an armature in operative relation to said magnet, one end of which projects into the path of said dog, and normally holds it against rotation in one direction, and a push button for closing said circuit.

4. In a device of the character described, the combination with a car, a controller and a controller crank, of a fender hinged to said car, a manually operated shaft on said car, and a flexible connection uniting said shaft and fender, whereby the fender is raised when the shaft is turned, a dog on the end of the shaft, a magnet in circuit with a source of power, an armature in operative relation to the magnet, one end of which engages said dog, and a circuit closer in said controller crank connected with said magnet.

5. In a device of the character specified, the combination with a car having a controller and a controller crank, of a fender hinged to said car, a revoluble shaft on said car, a flexible member attached to said shaft and fender, and means for turning the shaft to lift the fender, a dog on the lower end of the shaft, a magnet, one pole of which is connected with a source of power, a circuit closer in the handle of the controller crank, wires connecting said circuit closer with the other pole of the battery and with the crank, and an armature in operative relation to the magnet, one end of which engages said dog.

6. In a device of the character described, the combination with a car, having a controller and its operating crank, of a fender hinged to said car, a revoluble shaft, a flexible member connected to said shaft and fender, and a crank for turning said shaft to raise the fender, a dog on the end of the shaft, a magnet in circuit with a source of electric power, an armature in operative relation to said magnet, one end of which normally engages said dog, a contact on the controller insulated therefrom, a contact on the controller crank insulated therefrom and in engagement with the first contact, a circuit wire connecting the magnet with said first contact, a circuit closer in the handle of the crank, a circuit wire connecting said closer with the contact on the crank, and a circuit wire connecting said closer with the metal portion of the crank handle.

7. In a device as specified, the combination with a car having a controller and its operating crank, of a fender hinged to said car, a shaft revolubly mounted on the car, a flexible member connected to the shaft and fender, and means for turning the shaft to lift the fender, an electrically operated trip mechanism in cirucit with a source of power, for normally engaging the said dog, a circuit closer in the controller crank handle, and circuit wires connecting said controller with the trip mechanism and with the metal portion of the handle.

8. In a device as specified, the combination with a car having an electric current controller and its operating crank, of a magnet in circuit with a source of power, an armature in operative relation to the said magnet, an electric circuit closer in the crank handle insulated from the same, contacts on the controller and crank which engage and which are insulated from said controller and crank, a circuit wire extending from the contact on the controller to the magnet, circuit wires connecting the circuit closer with the crank contact and with the metal portion of the crank, a revoluble shaft on the car having a dog upon its lower end normally engaged by the end of said armature, a fender hinged to said car, and a flexible member connecting said fender and shaft.

9. In a device as specified, the combination with a car having a current controller and shaft, and an operating crank, of a fender hinged to the car, a revoluble shaft on said car having a dog upon its lower end, a flexible connection attached to said shaft and fender, whereby said fender is raised when the shaft is turned, a magnet on the car in circuit with a source of power, an armature in operative relation to said magnet, the end of which normally engages the said dog, a non-conducting socket upon the controller, surrounding its shaft, a contact ring in the bottom of said socket, and a circuit wire connecting said magnet and contact ring, a non-conducting element on the hub of the crank and a contact ring on said element, said hub being adapted to extend into the socket so that its contact will engage the socket contact, a circuit closer in the upper end of the crank handle, and circuit wires connecting the closer and crank contact and the closer and crank.

In testimony whereof I affix my signature in presence of two witnesses.

NATHAN FALLEK.

Witnesses:
G. SARGENT ELLIOTT,
ADELLA M. FOWLE.